(12) United States Patent
Steiner

(10) Patent No.: US 11,130,532 B2
(45) Date of Patent: Sep. 28, 2021

(54) TRACK JOINT ASSEMBLY AND TRACK LINK HAVING WEAR BAND STRUCTURED FOR ANTI-SCALLOPING

(71) Applicant: Caterpillar Inc., Deerfield, IL (US)

(72) Inventor: Kevin Steiner, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 375 days.

(21) Appl. No.: 16/120,996

(22) Filed: Sep. 4, 2018

(65) Prior Publication Data

US 2020/0070907 A1   Mar. 5, 2020

(51) Int. Cl.
*B62D 55/21*   (2006.01)

(52) U.S. Cl.
CPC .................... *B62D 55/21* (2013.01)

(58) Field of Classification Search
CPC ....................................... B62D 55/21
See application file for complete search history.

(56) References Cited

U.S. PATENT DOCUMENTS

| | | | |
|---|---|---|---|
| 3,955,855 A | 5/1976 | Massieon et al. | |
| 6,390,572 B1* | 5/2002 | Idetsu | B62D 55/21 305/103 |
| 9,290,217 B2 | 3/2016 | Steiner et al. | |
| 9,405,180 B2 | 8/2016 | Bowron et al. | |
| 10,322,759 B2* | 6/2019 | Lamela | B62D 55/21 |
| 2001/0003895 A1* | 6/2001 | Bedford | B21L 9/065 59/7 |
| 2006/0043791 A1* | 3/2006 | Sho | B62D 55/21 305/198 |
| 2011/0163595 A1* | 7/2011 | Kirchmair | B62D 55/21 305/46 |
| 2014/0083782 A1 | 3/2014 | Brewer | |
| 2014/0292068 A1* | 10/2014 | Hisamatsu | B62D 55/21 305/202 |
| 2015/0008730 A1 | 1/2015 | Steiner | |
| 2016/0339974 A1* | 11/2016 | Brooks | B62D 55/088 |

FOREIGN PATENT DOCUMENTS

| | | | |
|---|---|---|---|
| JP | 09249162 A | * | 9/1997 |
| JP | 2007326554 A | | 12/2007 |

* cited by examiner

*Primary Examiner* — Kip T Kotter
(74) *Attorney, Agent, or Firm* — Brannon Sowers & Cracraft

(57) ABSTRACT

A track joint assembly includes adjacent first and second track links each having an elongate link body with an upper rail surface located in part upon first and second link body ends and in part upon a middle section of the link. The upper rail surface forms part of a track rail having a segment formed by each of the middle sections of the elongate link bodies of the first and second track links and a compound segment formed by the two adjacent track links. The upper rail surface is formed of a sacrificial wear material that has a varying cross-sectional area structured to limit scalloping of the track links.

18 Claims, 3 Drawing Sheets

TRACK JOINT ASSEMBLY AND TRACK LINK HAVING WEAR BAND STRUCTURED FOR ANTI-SCALLOPING

TECHNICAL FIELD

The present disclosure relates generally to a track system in a ground-engaging machine, and more particularly to a track link for such a system having an upper rail surface and a wear band forming the upper rail surface with cross-sectional areas and/or width structured to limit scalloping of the track link during wear.

BACKGROUND

A wide variety of machines utilize tracks as ground-engaging propulsion elements, notably track-type tractors. It is common for such tracks to include a plurality of rotatable track-engaging elements, with each of two tracks at opposite sides of the machine forming endless loops moved about rotating components during operation. Such tracks typically each include two chains of coupled-together links, with bolted-on track shoes, and the links held together by way of track pins. The demands placed upon such machines and their associated tracks can be quite substantial with extremely high torsional loads, shearing loads, impacts, and still others. Machine tracks are commonly fairly robust to provide an operating life of thousands of hours despite significant stresses, strain, and wear.

In recent years, understanding and addressing wear phenomena in machine tracks has received considerable engineering attention. The various wear phenomena and wear rates experienced by machine track are typically a result of how the machine is used, the skill and experience of the operator, and both the particular underfoot conditions and substrate materials in the operating environment. Machines operated in sandy materials tend to wear certain components relatively more rapidly than machines used in less sandy and more earthen environments, for example. Field service life of machine track can vary based upon the factors mentioned above. Since machine track components can be relatively expensive to service and replace, not to mention the negatives of machine down-time, engineering efforts in this field have often centered around reducing and managing wear between and among components. U.S. Pat. No. 3,955,855 to Massieon et al. is directed to a track-type machine having track links with contact surfaces formed of relatively high wear-resistant material. The material is apparently a composite alloy metallurgically bonded to a base material of the track links.

SUMMARY OF THE INVENTION

In one aspect, a track joint assembly for a track system in a ground-engaging machine includes a first track link, a second track link, and a track pin. Each of the first track link and the second track link includes an elongate link body having a first link body end with a first link strap, a second link body end with a second link strap and being laterally offset from the first link body end, and a middle section. The elongate link body further includes a first track pin bore formed in the first link body end and a second track pin bore formed in the second link body end. The elongate link body of each of the first and the second track links further includes a lower shoe-mounting surface, and an upper surface. The track pin is received through the first and the second track pin bores and couples the first track link to the second track link such that the upper surfaces form a track rail. The track rail has a first segment upon the middle section of the first track link, a second segment formed upon the middle section of the second track link, and a compound third segment located in part upon the first link body end of the first track link and the second link body end of the second track link. The upper surfaces of the first and the second track links are formed of a sacrificial wear material and varying in width, such that the compound third segment of the track rail has an idler-contact width that is equal to about 90% or less of an idler-contact width of either of the first segment or the second segment to retard scalloping of the first and the second track links.

In another aspect a track link for a track system in a ground-engaging machine includes an elongate link body having a first link body end with a first link strap and a second link body end with a second link strap, and a middle section. The first link body end is laterally offset from the second link body end. The elongate link body further includes a lower shoe-mounting surface, and an upper surface located in part upon each of the first and the second link body ends and the middle section and forming a track rail. The elongate link body further includes a sacrificial wear material that extends vertically downward from the upper surface to form a wear band, and varying in link body thickness within the wear band such that a cross-sectional area of the wear band within the middle section is greater than a sum of the cross-sectional areas of the wear band within the first and the second link body ends by a factor of about 1.1 or greater.

In still another aspect, a track link for a track system in a ground-engaging machine includes an elongate link body having a first link body end with a first link strap and a second link body end with a second link strap, and a middle section. The first link body end is laterally offset from the second link body end such that the elongate link body forms an S-pattern. The elongate link body further includes a first track pin bore formed adjacent to the first link body end and a second track pin bore formed adjacent to the second link body end, and each of a first bolting window and a second bolting window located between the first and the second track pin bores. The elongate link body further includes a lower shoe-mounting surface, and an upper surface located in part upon each of the first and the second link body ends and the middle section and forming a track rail. The upper surface is formed of a sacrificial wear material varying in width such that a width of the upper surface within each of the first link body end and the second link body end is equal to about 45% or less of a width of the upper surface within the middle section to retard scalloping of the track link.

DETAILED DESCRIPTION

Figure 1:
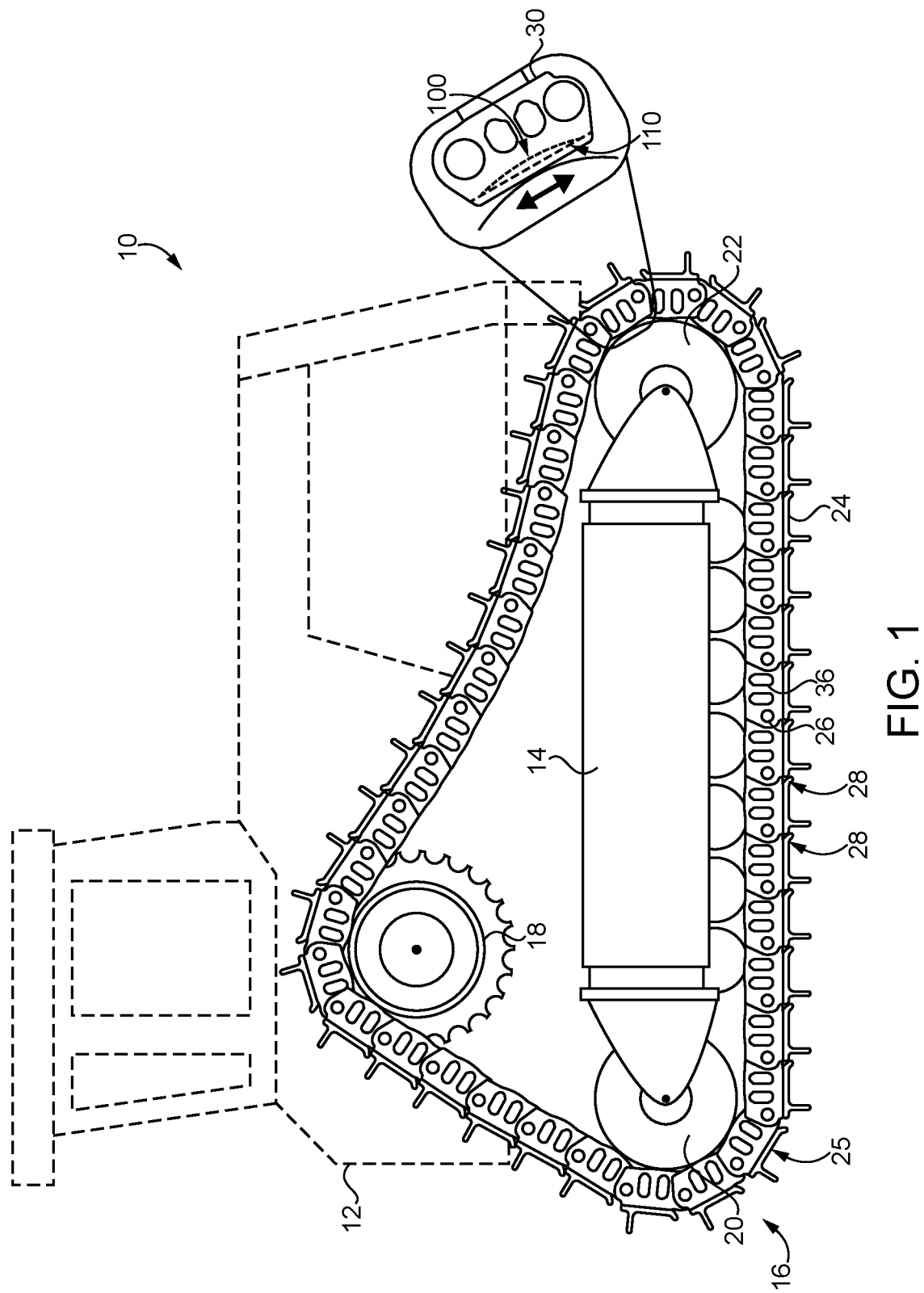
FIG. 1 is a side diagrammatic view of a machine, including a detailed enlargement, according to one embodiment.

Referring to FIG. 1, there is shown a ground-engaging machine 10 including a frame or body 12, according to one embodiment. Body 12 is coupled with a track roller frame 14, that supports a track system 16 for propelling ground-engaging machine 10 (hereinafter "machine 10"). Track system 16 includes a drive sprocket 18, a back idler 20, and a front idler 22. A ground-engaging track 25 extends about drive sprocket 18 and each of idlers 20 and 22. It will be understood that track 25 is positioned at a first side of body 12 and track roller frame 14 includes a first track roller frame 14, with machine 10 having a second track roller frame 14 and a second track positioned upon an opposite side of body 12 and structured substantially identically to that depicted in FIG. 1. Those skilled in the art will recognize the so-called "high drive configuration" of track 25 and track system 16 in machine 10. It will be appreciated that other track configurations such as an oval track could fall within the scope of the present disclosure. A plurality of additional track-engaging elements (not numbered) including track rollers and carrier rollers, may be part of track system 16. Machine 10 is shown in the context of a track-type tractor, but could be any of a variety of other machines such as a track loader, a half-track machine, or a variety of other off-highway pieces of equipment. FIG. 1 also includes a detailed enlargement illustrating a first pattern of contact between idler 22 and a track link 36 that might be observed in a track system according to the present disclosure by way of a wear profile 110. FIG. 1 also illustrates a pattern of contact that might be observed according to a conventional design by way of a wear profile 100. It will be recognized that wear profile 110 is substantially linear along a length of the subject track link 36, whereas wear profile 100 has a "scalloped" shape. Sliding contact with rotatable track-engaging elements as a ground-engaging track advances, in particular about the one or more idlers, has been observed to produce wear in the nature of scalloping that can limit track service life. As will be further apparent from the following description, track system 16 is uniquely configured to address certain wear phenomena and thus extend service life over known designs.

Figure 2:
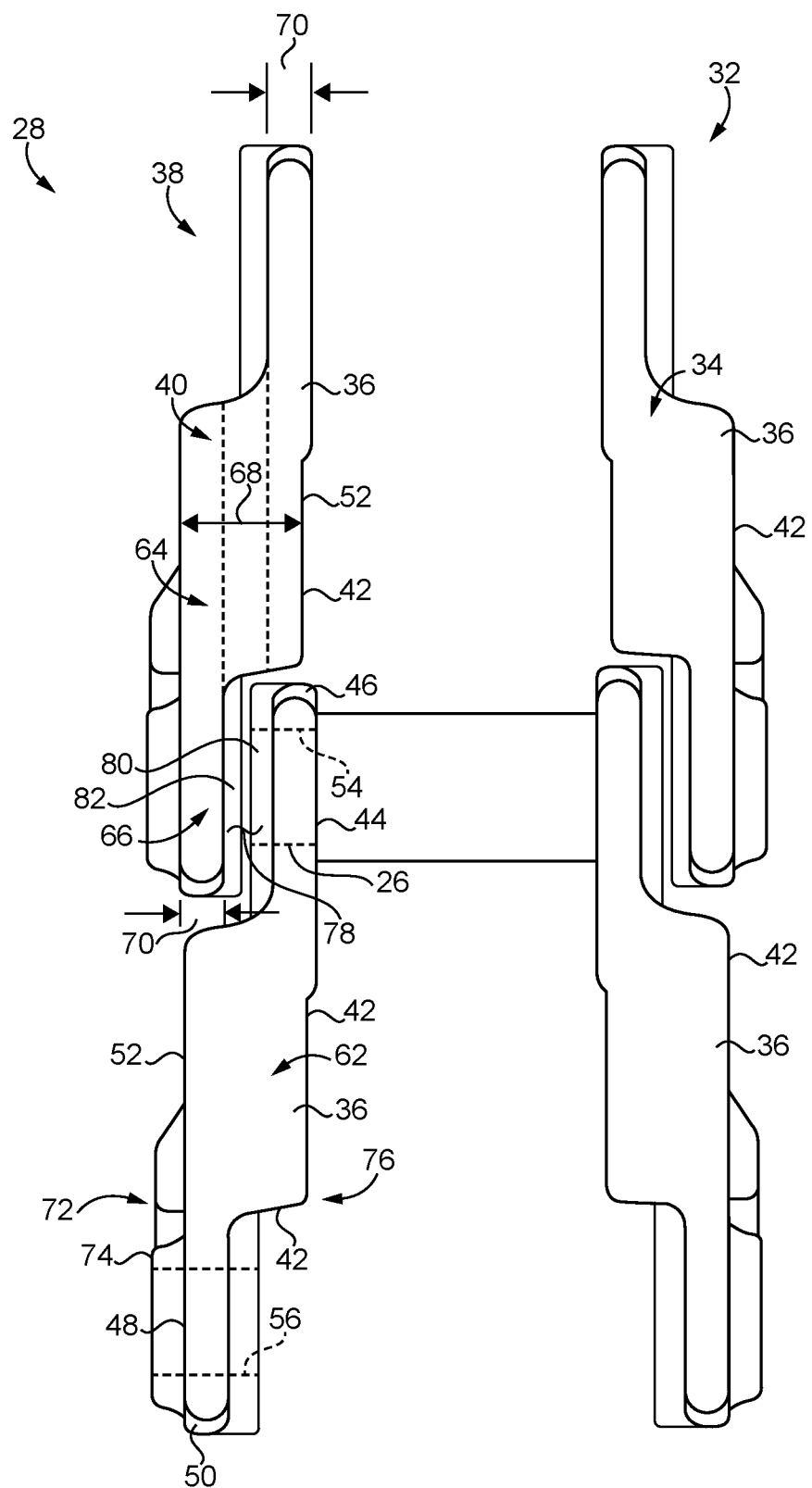
FIG. 2 is a top view of a section of ground-engaging track including a track joint assembly, according to one embodiment.

Track 25 includes a plurality of track joint assemblies 28 each formed by a plurality of track links 36 and a track pin 26. Referring also to FIG. 2, there is shown one track joint assembly 28 illustrating certain features in further detail. Track joint assembly 28 can include a first track link 36, a second track link 36, and a track pin 26. It will be appreciated that the present description focuses on components on the left side of the FIG. 2 illustration, but is analogously applicable to the right side components. Track links 36 shown on the right side of the illustration in FIG. 2 form another track joint with the same track pin 26, in a first track chain 32 having a first track rail 34. Track links 36 shown on the left side of the illustration in FIG. 2 form track joint assembly 28 in a second track chain 38 having a second track rail 40. For purposes of ease of description each of track links 36 can also be understood to include a track rail or section of track rail, with the plurality of coupled-together track links 36 in each track chain 32 and 38 also understood to form a track rail or section thereof. Rotatable track-engaging elements, including idlers 20 and 22, engage with and ride upon track rail 34 and track rail 40 as further discussed herein.

Figure 3:
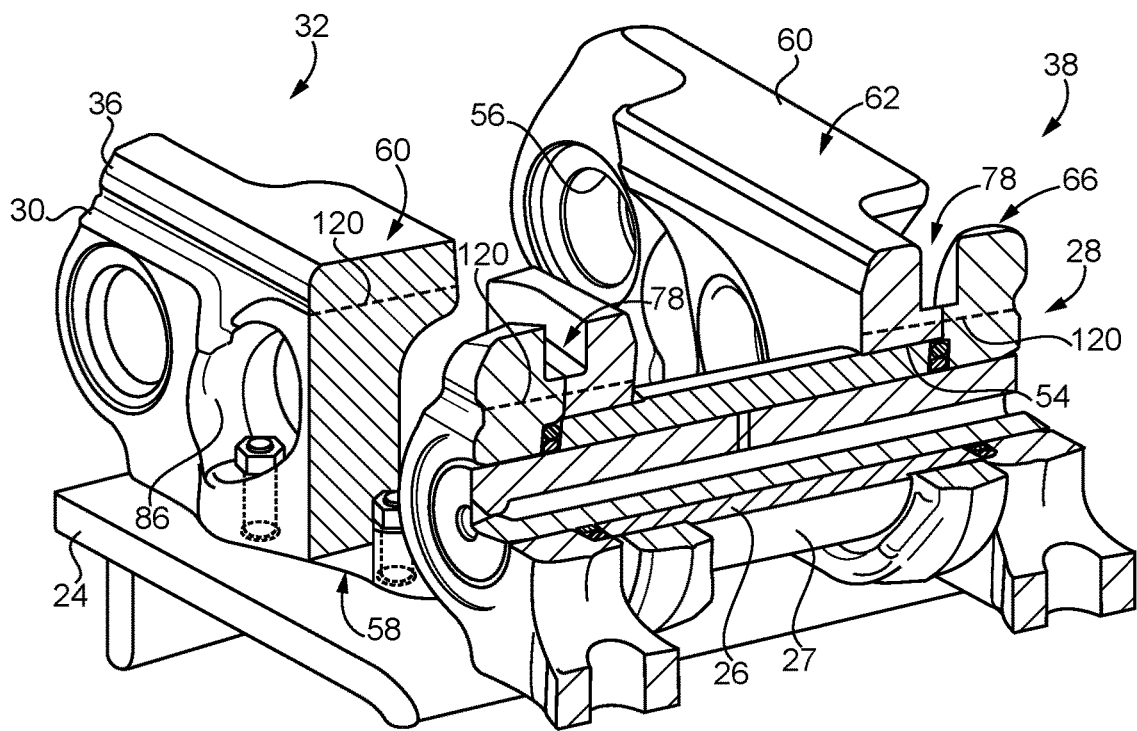
FIG. 3 is a sectioned view in two section planes of a track joint assembly, according to one embodiment.

Referring also now to FIG. 3, there are shown additional features of track joint assembly 28. As noted above, track chain 32 and track chain 38 are coupled together by a plurality of track pins 26. Track pins 26 can also couple together adjacent ones of the plurality of track links 36 in each track chain 32 and 38. In the illustrated embodiment, a rotatable bushing 27 is positioned upon track pin 26, and can be internally lubricated, such that bushing 27 rotates when coming into and/or out of contact with teeth of drive sprocket 18, for instance. The present description refers to a first track link and a second track link each identified with reference numeral 36. It will be appreciated that the terms "first" and "second" are used herein in reference to two adjacent track links, either of which could be considered the first link or the second link, depending upon perspective. Certain reference numerals are also used to identify features on each of the first track link and the second track link that are similar, being literally identical or mirror images of one another. In FIG. 2, for purposes of description, the first track link can be understood to be track link 36 in the lower left portion of the drawing, with the second track link understood as track link 36 in the upper left portion of the drawing. Each of first track link 36 and second track link 36 includes an elongate link body 42 having a first link body end 44 with a first link strap 46, and a second link body end 48 with a second link strap 50. Second link body end 48 is laterally offset from first link body end 44. It will further be understood that the pattern of lateral offset is the opposite in the plurality of track links 36 in track chain 32 versus that in track chain 38. In an implementation, the first link body end 44 and the second link body end 48 in each of the plurality of track links 36 forming first track chain 32 are laterally offset from one another such that each elongate link body 42 forms a right-handed S-pattern. First link body end 44 and second link body end 48 in each of the plurality of track links 36 forming track chain 38 are laterally offset from one another such that each elongate link body 42 forms a left-handed S-pattern. Those skilled in the art will be familiar with "S-shaped" links, the literal shape of which can be thought of as a somewhat squished-down S or Z. The terms "left-handed" and "right-handed" are used herein in a relative sense, with the outermost part of track links 36 that are right-handed being on a right side of the track chain when viewed looking in a direction of forward travel of track 25 and the associated machine 10, the viewpoint depicted in FIG. 2. The term "left-handed" is understood according to an analogous convention. Track links 36 used in the respective track chains 32 and 38 are typically mirror images of one another.

Elongate link body 42 of each of the first and second track links 36 further includes a lower shoe-mounting surface 58. Track shoes 24 may be bolted to each track link 36 by way of bolts (not numbered) accessed by way of a first bolting window 84 and a second bolting window 86. Elongate link body 42 further includes a first track pin bore 54 formed in first link body end 44 and a second track pin bore 56 formed in second link body end 48. First bolting window 84 and second bolting window 86 are located between first and second track pin bores 54 and 56. Elongate link body 42 further includes an upper rail surface or upper surface 60 located in part upon each of first link body end 44, second link body end 48, and middle section 52. Track pin 26 is received through first and second track pin bores 54 and 56 and couples the first track link 36 to the second track link 36 such that upper surfaces 60 of the first and second track links 36 form track rails 34 and 30. Each track rail 34 and 40 has a first segment 62 formed upon middle section 52 of the first track link 36 and a second segment 64 formed upon middle section 52 of the second track link 36, and a compound third segment 66. Each of first and second segments 62 and 64 is formed entirely upon one elongate link body 42. Compound third segment 66 is formed in part upon each of first link body end 44 of the first track link 36 and second link body end 48 of the second track link 36. It can thus be seen from FIG. 2, for example, that each track rail 34,40 can be thought of as including segments that are formed entirely upon a single one of track links 36 in an alternating arrangement with segments that are formed upon the ends of two adjacent ones of track links 36.

In the case of scalloping wear from idler-contact, it has been observed that wear tends to be most severe on segments 64 toward the middle of each track link 36, since idlers 20 and 22 slide against segments 62 and 64 as track 25 comes into and out of contact with idlers 20 and 22. Sliding contact is not observed, or at least is substantially less, where idlers 20 and 22 contact compound segment 66. Accordingly, the wear and consequent shedding of material from track links 36 is biased toward the idler-contact center surfaces of track links 36, resulting in the familiar scalloped shape. According to the present disclosure, each elongate link body 42 includes, and upper surfaces 60 of the first track link 36 and the second track link 36 in track joint assembly 28 are formed of, a sacrificial wear material. As further discussed below, link shape and proportions, and placement of sacrificial wear material can be tailored to retard scalloping.

It can also be noted from FIG. 2 that elongate link body 42 has an outboard side 72 including a link pin boss 74 formed on the corresponding second link body end 48, and an inboard side 76. A void 78 extends between outboard side 72 of first link body end 44 and inboard side 76 of second link body end 48. In the illustrated embodiment, void 78 extends from the middle section 52 of the first track link 36 to the middle section 52 of the second track link 36. Each elongate link body 42 further has a first shoulder 80 formed on outboard side 72 upon first link body end 44, and a second shoulder 82 formed on inboard side 76 upon second link body end 48. Void 78 is defined in part by first shoulder 80 and second shoulder 82. Shoulders 80 and 82 may be angular or rounded and form a stepped profile where link body thickness 90 and 92 changes. Elongate link body 42 of the first track link 36 and elongate link body 42 of the second track link 36 each have another shoulder located, respectively, at the corresponding second link body end 48 and first link body end 44, between one of track pin bores 54,56 and upper surface 60.

As noted above, proportioning of track links 36 and placement of sacrificial wear material forming upper surfaces 60 on each track link 36 can bias wear to occur in a pattern that produces a relatively flat wear profile 110 as depicted in FIG. 1. In FIG. 2 a first idler-contact width 68 extends across upper surface 60 between outboard side 72 and inboard side 76. A second idler-contact width 70 is shown in connection with upper surface 60 within first and second link body ends 44 and 48. Constructing upper surface 60 to have a relatively thinner lateral extent where sliding contact with rotatable track-engaging elements is less apt to occur in comparison to where sliding contact is more apt to occur can cause the sacrificial wear material to wear away at a rate in first and second link body ends 44 and 48 that compensates for what would be an otherwise relatively greater wear rate in middle section 52. Widths 70 may together be less than width 68. Compound third segment 66 of track rail 40 (and analogously counterpart mirror-image features of track rail 34) may have an idler-contact width, that is, a sum of the two widths 70, equal to about 90% or less of idler-contact width 68 of each of middle segment 62 and middle segment 64. Stated another way, width 70 may be equal to about 45% or less of width 68, to retard scalloping of the first and the second track links 36.

The above range of widths can retard scalloping, generally, by compensating for wear rates that tend to be from about 20% to about 30% higher in the center of a track link versus the ends of the track link in links of standard widths and proportions and materials. Wear rates, including relative wear rates, and wear modes can vary depending upon substrate materials, the manner in which the associated machine is used, and still other factors. For instance, operating in substrates where particles tend to gouge wear surfaces as opposed to where particles tend to scrape wear surfaces can lead to differing wear modes, and thus different optimized relative widths and/or other proportional characteristics in a track link according to the present disclosure. In general terms, however, the thinner that the link body ends are made relative to the middle section 52 of the link body, the faster the rates of wear will be at the link ends in terms of decrease in link height. A compound third segment width that is about 90% or less of the full width at the first and second segments 62 and 64 is nevertheless contemplated as a practical implementation strategy. The compound third segment 66 might be about 80% or less, potentially about 60% or less, of the full width as described herein, and still within the scope of the present disclosure. A lower limit to the idler-contact width of compound third segment 66 might be about 40% to 50% of the full width of the first and second segments 62 and 64, although the present disclosure is not thereby limited. In other implementations, rather than an optimized pattern of relative widths, a varying cross-sectional area of elongate link body 42 at different locations can provide a desired scallop-retarding wear pattern. Sacrificial wear material within elongate link body 42 may extend vertically downward from upper surface 60 to form a wear band, the bottom of which is generally depicted by boundary 120 shown in FIGS. 3 and 4. Elongate link body 42 may vary in link body thickness 90 and 92 within the wear band such that a cross-sectional area of the wear band within middle section 52 is greater than a sum of the cross-sectional areas of the wear band within first and second link body ends 42 and 48 by a factor of about 1.1 or greater, potentially about 1.2 or greater, or about 1.3 or greater, or about 1.4 or greater. Stated another way, the cross-sectional area of material above boundary 120 in middle section 52 may be at least 10% greater than the cross-sectional areas of material above boundary 120 in each of first and second link body ends 42 and 48. The term "about" can be understood herein in the context of conventional rounding to a consistent number of significant digits. Accordingly, "about 10" means from 9.5 to 10.4, "about 1.1" means from 1.05 to 1.14, and so on. Cross-sectional area within middle section 52 and cross-sectional areas within first and second link body ends 42 and 48 could also vary depending upon the longitudinal location of the cross section considered. Typically, however, the respective cross-sectional areas will be substantially longitudinally uniform within middle section 52 and substantially longitudinally uniform within first and second link body ends 42 and 48.

Figure 4:
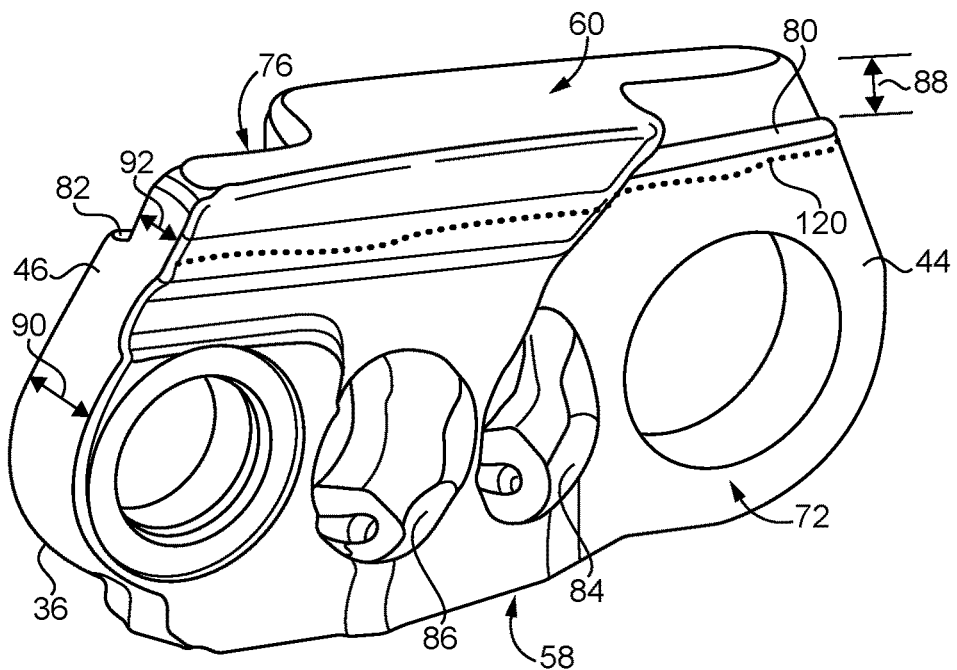
FIG. 4 is a perspective view of a track link, according to one embodiment.

As shown in FIG. 4, elongate link body 42 may have a second link body thickness 92 at a location vertically above shoulder 82 and shoulder 80, and a first link body thickness 90 below shoulders 82 and 80. First link body thickness 90 is within first and second link body ends 44 and 48 adjacent to first and second track pin bores 54 and 56, and the second link body thickness 92 is within first and second link body ends 44 and 48 within the wear band. Link body thickness 90 may be greater than link body thickness 92 by a factor of about 2 or less. Also shown in FIG. 4 is a depth 88 of each of shoulders 82 and 80 from upper surface 60. Depth 88 may be close to or equal to a vertical thickness of the wear band in a new link and can be from about 10% to about 30% of a corresponding full vertical height of elongate link body 42 from lower shoe-mounting surface 58 to upper surface 60, although the present disclosure is not thereby limited. A full vertical height of elongate link body 42 may be greater than a depth of the wear band by a factor of about 5 or greater. In a further implementation, elongate link body 42 may be relatively taller than other known track links and can be thought of as constructed by reallocating link body material from regions defined by shoulders 82 and 80 to upper surface 60. In other words, a volume of link body material can be understood as having been repositioned from the inboard and outboard sides 72 and 76 to the top of the link, such that the now relatively thinner link is made taller, potentially by about 10 millimeters to about 50 millimeters as compared to certain known designs. Also shown in FIG. 4 is boundary 120 representing different hardnesses of link body material from which elongate link body 42 is made so as to define the wear band. A footprint of the wear band may be congruent with a footprint of upper surface 60. Congruent means the shapes are similar and one fits inside the other. One rectangle is typically congruent with another rectangle, but a square is not likely congruent with a rectangle, for example. In a practical implementation, the link body material is varying in hardness such that at least a majority of the link body material between shoulders 82 and 80 and upper surface 60 is hardened to a relatively greater extent. At least a majority of the link body material between shoulders 82 and 80 and the lower shoe-mounting surface 58 is hardened to a relatively lesser extent. Within the wear band the link body material might be greater than 50 HRC (Rockwell hardness C) whereas outside of the wear band the link body material might be less than 50 HRC.

INDUSTRIAL APPLICABILITY

Referring to the drawings generally, as track 25 is advanced forward or backward about rotatable track-engaging elements 18, 20, 22, bending of track 25 at track joints 28 can cause inside surfaces, namely those forming track rails 34 and 40, to effectively shorten relative to outer surfaces of track 25. In the detailed enlargement of FIG. 1 it can be seen that idler 22 contacts track link 36, and will slide relative to track link 36 and in particular upper surface 60, as track 25 curves to move into engagement with or out of engagement with front idler 22. As track 25 engages and disengages with idler 22, and engages and disengages with other rotatable track-engaging elements, upper surface 60 will experience greater sliding contact in first and second segments 62 and 64 versus compound third segment 66. The relatively lesser idler-contact surface area of compound third segments 66 results in a compensating wear rate, such that overall the rate at which sacrificial wear material sheds from elongate link body 42 is relatively uniform longitudinally along each track link 36. With prior strategies, link scalloping could be so severe that operators would be unable, or refuse, to continue operating the associated machine due to the roughness of the ride. It is thus contemplated that the present disclosure can enable improved operator comfort, machine operating efficiency, and overall track service life.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track joint assembly for a track system in a ground-engaging machine comprising:
    a first track link;
    a second track link;
    a track pin;
    each of the first track link and the second track link including an elongate link body having a first link body end with a first link strap, a second link body end with a second link strap and being laterally offset from the first link body end, a middle section, a first track pin bore formed in the first link body end, and a second track pin bore formed in the second link body end;
    the elongate link body of each of the first track link and the second track link further including a lower shoe-mounting surface and an upper surface, and the track pin being received through the first and the second track pin bores and coupling the first track link to the second track link such that the upper surfaces form a track rail;
    the track rail having a first segment upon the middle section of the first track link, a second segment upon the middle section of the second track link, and a compound third segment located in part upon each of the first link body end of the first track link and the second link body end of the second track link;
    the upper surfaces of the first and the second track links being formed of a sacrificial wear material and varying in width, such that the compound third segment of the track rail has an idler-contact width that is equal to 90% or less of an idler-contact width of either of the first segment or the second segment to retard scalloping of the first and the second track links;
    the first track link has a first shoulder formed on the outboard side of the first link body end, and the elongate link body of the second track link has a second shoulder formed on the inboard side of the second link body end; and
    the sacrificial wear material in each of the first track link and the second track link extending vertically downward from the respective upper surface to the first shoulder and to the second shoulder to form, in each of the first track link and the second track link, a wear band having a cross-sectional area of sacrificial material at least 10% greater in each respective middle section than a cross-sectional area of sacrificial wear material in the respective first and second link body ends.

2. The track joint assembly of claim 1 wherein the elongate link body of each of the first and the second track links has an outboard side including a link pin boss formed on the corresponding second link body end, and an inboard side.

3. The track joint assembly of claim 2 wherein a void extends between the outboard side of the first link body end of the first track link and the inboard side of the second link body end of the second track link.

4. The track joint assembly of claim 3 wherein the void extends from the middle section of the first track link to the middle section of the second track link.

5. The track joint assembly of claim 3 wherein the void is defined in part by each of the first shoulder and the second shoulder.

6. The track joint assembly of claim 5 wherein the elongate link body of the first track link and the elongate link body of the second track link each have another shoulder located, respectively, at the corresponding second link body end and first link body end.

7. The track joint assembly of claim 1 wherein the upper surface of the elongate link body of each of the first track link and the second track link is flat.

8. A track link for a track system in a ground-engaging machine comprising:
   an elongate link body having a first link body end with a first link strap and a second link body end with a second link strap, and a middle section;
   the elongate link body further including a first track pin bore formed adjacent to the first link body end and a second track pin bore formed adjacent to the second link body end;
   the elongate link body further including a lower shoe-mounting surface, an upper surface located in part upon each of the first and the second link body ends and the middle section and forming a track rail, and a shoulder formed on the second link body end upon the outboard side between the second track pin bore and the upper surface;
   the elongate link body further including a sacrificial wear material that extends vertically downward from the upper surface to the shoulder to form a wear band, and varying in link body thickness within the wear band such that a cross-sectional area of the wear band within the middle section is greater than a sum of the cross-sectional areas of the wear band within the first and the second link body ends by a factor of about of 1.1 or greater; and
   the wear band has a relatively greater hardness, and the elongate link body has a relatively lesser hardness forming the first and the second track pin bores.

9. The track link of claim 8 wherein the cross-sectional area of the wear band is substantially longitudinally uniform within the middle section and substantially longitudinally uniform within each of the first and the second link body ends.

10. The track link of claim 8 wherein:
   the elongate link body has a first link body thickness within the first and the second link body ends adjacent to the first and the second track pin bores, respectively, and a second link body thickness within the first and the second link body ends at the wear band; and
   the first link body thickness is greater than the second link body thickness by a factor of about 2 or less.

11. The track link of claim 8 wherein:
   the elongate link body includes an outboard side and an inboard side, and a link pin boss formed on the second link body end upon the outboard side; and
   the elongate link body further includes, and another shoulder formed on the first link body end upon the inboard side between the first track pin bore and the upper surface.

12. The track link of claim 8 wherein the upper surface is flat.

13. The track link of claim 12 wherein a width of the upper surface within each of the first link body end and the second link body end is equal to about 45% or less of a width of the upper surface within the middle section.

14. A track link for a track system in a ground-engaging machine comprising:
   an elongate link body having a first link body end with a first link strap and a second link body end with a second link strap, and a middle section, and the first link body end being laterally offset from the second link body end such that the elongate link body forms an S-pattern;
   the elongate link body further including a first track pin bore formed adjacent to the first link body end and a second track pin bore formed adjacent to the second link body end, and each of a first bolting window and a second bolting window located between the first and the second track pin bores;
   the elongate link body further including a lower shoe-mounting surface, and an upper surface located in part upon each of the first and the second link body ends and the middle section and forming a track rail;
   the upper surface being formed of a sacrificial wear material and varying in width, such that a width of the upper surface within each of the first link body end and the second link body end is equal to about 45% or less of a width of the upper surface within the middle section to retard scalloping of the track link;
   the elongate link body is a one-piece body, and includes an outboard side and an inboard side;
   the elongate link body further includes a first shoulder formed on the first link body end upon the inboard side between the first track pin bore and the upper surface, and a second shoulder formed on the second link body end upon the outboard side between the first track pin bore and the upper surface;
   at least a majority of the link body between the upper surface and each of the first shoulder and the second shoulder has a relatively greater hardness; and
   at least a majority of the link body between the lower shoe-mounting surface and each of the first shoulder and the second shoulder has a relatively lesser hardness.

15. The track link of claim 14 wherein the elongate link body further includes a link pin boss formed on the second link body end upon the outboard side.

16. The track link of claim 14 wherein the sacrificial wear material extends vertically downward from the upper surface to form a wear band, and the wear band has the relatively greater hardness, and material of the elongate link body forming the first and the second track pin bores has the relatively lesser hardness.

17. The track link of claim 16 wherein a full vertical height of the elongate link body is greater than a depth of the wear band by a factor of about 5 or greater, and a footprint of the wear band is congruent with a footprint of the upper surface.

18. The track link of claim 16 wherein the upper surface is flat.

* * * * *